United States Patent [19]
Chan

[11] 3,900,962
[45] Aug. 26, 1975

[54] GROUND FERTILIZER DEVICE

[76] Inventor: See Fong Chan, 47-09 Newtown Rd., Astoria, N.Y. 11103

[22] Filed: Sept. 6, 1974

[21] Appl. No.: 503,798

[52] U.S. Cl. .................................. 47/48.5; 73/188
[51] Int. Cl. ........................................... A01g 29/00
[58] Field of Search ............ 47/48.5, 1, 47; 73/171, 73/188, 189

[56] References Cited
UNITED STATES PATENTS

| | | | |
|---|---|---|---|
| 419,242 | 1/1890 | Brown | 47/48.5 |
| 1,118,259 | 11/1914 | Beard | 73/171 X |
| 1,407,068 | 2/1922 | Johnson | 73/171 |
| 1,984,265 | 12/1934 | Hamer | 47/48.5 |
| 2,384,954 | 9/1945 | Moore | 73/171 |
| 2,520,557 | 8/1950 | Moore | 73/171 |
| 2,570,710 | 10/1951 | Quinteros | 73/171 |
| 2,935,872 | 5/1960 | Misner | 73/189 |
| 3,755,966 | 9/1973 | Smith | 47/48.5 |
| 3,821,863 | 7/1974 | Chan | 47/48.5 |

*Primary Examiner*—Robert E. Bagwill

[57] ABSTRACT

An outdoor tree and plant fertilizer. The device employed as such includes a wind driven air and rain water collector and tubes are provided for conveying both elements together with fertilizer to ground level and into the ground proximate the plant roots. The plant feed components are caused to go into the ground in a controlled or metered fashion at selected stages of ground depth. Apertured, concentric piping is provided to achieve the desired control of the fertilizer passage and deflectors disposed within the pipes at separate levels therein insure that such passage into the ground occurs at separate stages or levels.

7 Claims, 5 Drawing Figures

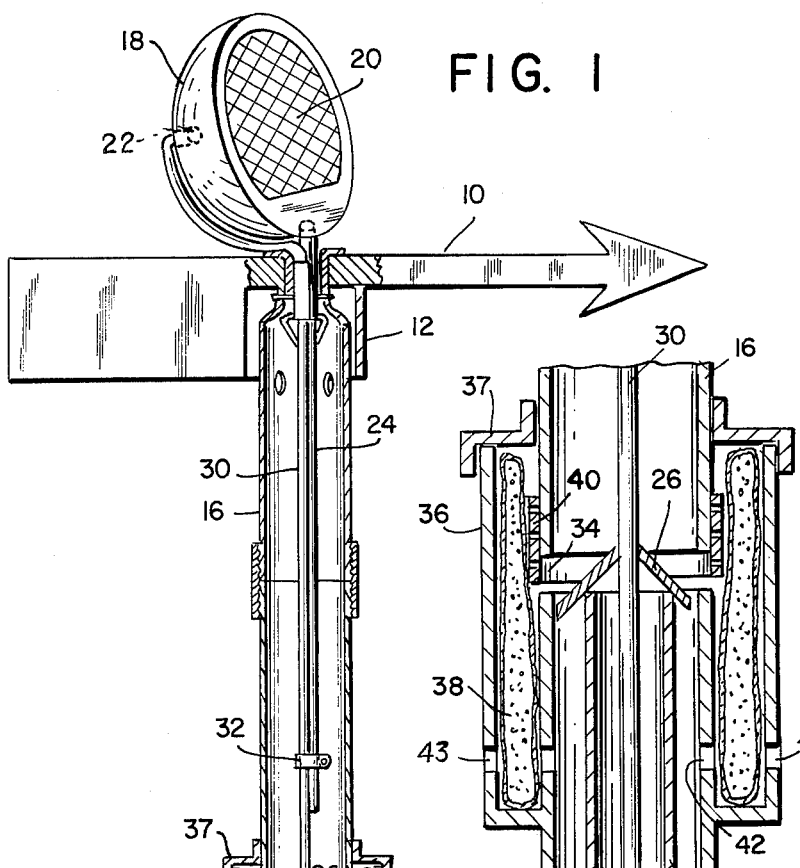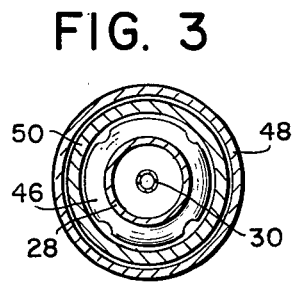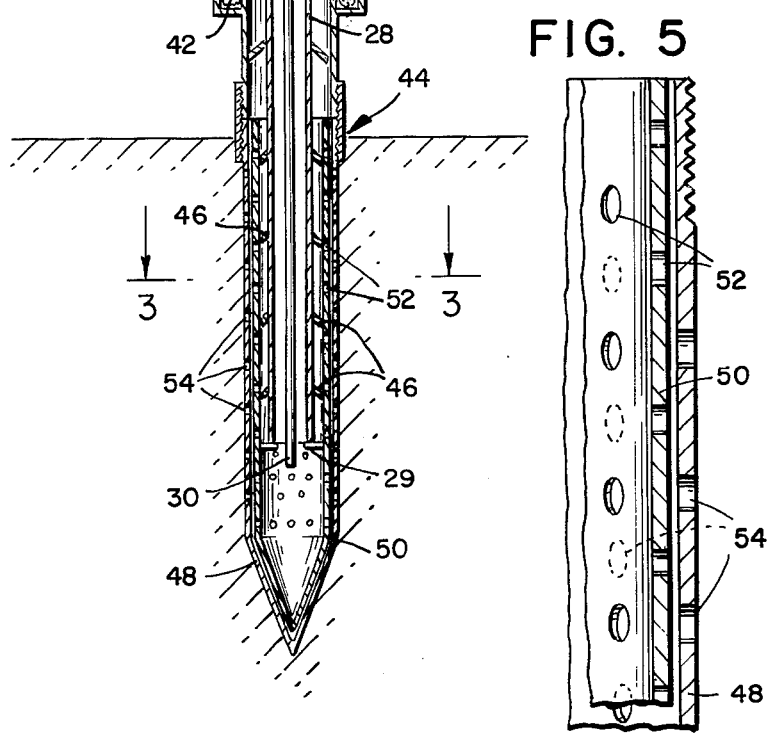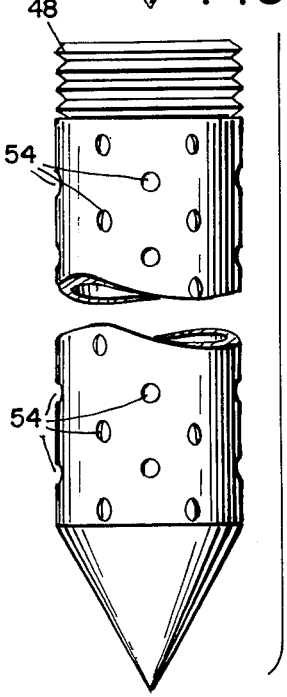

GROUND FERTILIZER DEVICE

The invention relates to fertilizer devices and, in particular, to such devices which provide a controlled passage for fertilizer, air and water into the ground adjacent plant life.

The patent art discloses several forms of a unique ground fertilizing mechanism for metering the passage of air, water and fertilizer into the ground. The present device improves these patented devices by providing a wind driven air and/or water collector and separate tubing for each leading toward and into the ground. Associated with the water passage tubing is a container of fertilizer the content of which is washed onto and into the ground by the water during its passage. The dampened fertilizer and air are deflected by components disposed within the piping embedded in the ground to cause the mixture to seep therein at separate levels of ground depth. The piping is apertured adjacent such components to effect the desired control over the rate of seepage.

One object of the invention is to provide a fertilizer device having a facility to collect the natural atmospheric elements needed for healthy plant or tree life and convey them with a specially provided fertilizer to several levels of ground depth and pass the mixture into the ground at the several levels in a controlled manner.

Other objects and advantages of the invention may be perceived on reading the following description of one embodiment thereof taken together with the accompanying drawings, in which:

FIG. 1 is a section in elevation of the ground fertilizing device;

FIG. 2 is an enlarged detail showing the fertilizer container therefor;

FIG. 3 is an enlarged section taken on the line 3—3 of FIG. 1;

FIG. 4 is a detail of the apertured pipe section of the device; and

FIG. 5 is a detail in section showing the relative distribution of apertures in the piping.

Referring to the drawings wind vane 10, having depending central flange 12, is mounted on a hollow stub shaft which is journalled to rotate in the top of sleeve 16.

Mounted on the top of the vane 10 over the shaft 12 is wind and rain water collector 18 which is disposed thereon in inclined state. The collector has formed therein a spherical surface 20 in which there is centrally provided in its bottom portion a rain water hole communicating with water tubing 24, the latter passing through the body of the body of the vane 10 and into the sleeve 16 terminating at its lower end just above water deflector 26 mounted on support pipe 28 disposed in the sleeve on stop 29.

An air aperture 22 located in surface 20 of the collector 18 communicates with air tube 30 which extends through the vane 10 and into the sleeve 16 terminating near the bottom of the device. The tubes 24 and 30 are tied together by coupling 32 and revolve together with the vane for distributing the rain water about the deflector 26.

As shown in detail in FIG. 2 the sleeve is apertured at 34 adjacent deflector 26, the aperture 34 communicating with housing 36 mounted on the sleeve. A porous container 38 of fertilizer is disposed within the housing 36. The amount of water flowing into contact with the container 38 is regulated by band 40 mounted to slide on the sleeve to control the size of the opening of aperture 34. Below the deflector 26 there is provided a second aperture 42 in the sleeve and in communication with the fertilizer housing through which the fertilizer is washed by the rain water into the interior of the device above the outlet side thereof. The housing 36 has a removable cover 37 permitting access into the interior of the housing. Some of the water and fertilizer escapes through housing aperture 43 falling to the top surface of the ground where it is absorbed and used in that manner for plant nurture.

There is provided in the outlet section 44 a plurality of disc distributors 46 which are mounted on the support pipe 28. In this section apertured pipe 48 is threadably connected to the end of the sleeve 16. A second apertured pipe 50 is disposed in the interior in wall contact therewith. As shown in FIG. 5 apertures 52 in the interior pipe 50 and apertures 54 in the exterior pipe are in staggered array whereby the fertilizer fluid deflected from the disc distributors 46 passes first through the apertures 52 and runs down the pipe 50 before exiting into the ground through the outer apertures 54. A slow and controlled passage of fluid is thereby assured. In addition, the ground is aerated by air passing from the collector 18 through the tubing 30 to the bottom of the device and thence rising to exit into the ground through the apertures 52 and apertures 54.

Various modifications of the invention may be effected by persons skilled in the art without departing from the scope and principle thereof as defined in the appended claims.

What is claimed is:

1. A ground fertilizing device comprising an apertured pipe adapted to be vertically inserted into the ground, an air and rain water collector rotatably mounted on the upper end of said pipe, a weather vane being fixedly mounted on said collector, and air and water distributing means in fluid communication with and extending from said collector into said pipe interior and adapted to distribute air and water to said pipe apertures.

2. A ground fertilizing device as in claim 1, further comprising a fertilizer housing mounted on said pipe and in communication with certain of said pipe apertures, there being a first fluid deflector adjacent to and interiorly of said apertures.

3. A ground fertilizing device as in claim 2, further comprising means adjacent said certain pipe apertures to adjust the amount of water distributed from said pipe into said fertilizer housing.

4. A ground fertilizer device as in claim 1, wherein said air and water distributing means includes a second apertured pipe disposed within said first mentioned pipe, there being vertically spaced second fluid deflectors mounted adjacent the apertures thereof.

5. A ground fertilizing device as in claim 4, wherein the apertures of said first and second pipes are vertically staggered.

6. A ground fertilizing device as in claim 1, wherein said distributing means includes an air tube extending from said collector to a point adjacent the bottom of said apertured pipe.

7. A ground fertilizing device as in claim 1, wherein said distributing means includes a water tube extending from said collector to a point above said first fluid deflector.

* * * * *